United States Patent [19]
Decker et al.

[11] Patent Number: 5,997,954
[45] Date of Patent: Dec. 7, 1999

[54] METHOD OF RENDERING SUBSTRATES WATER REPELLENT USING HYPERBRANCHED POLYMERS CONTAINING SILICON ATOMS

[75] Inventors: Gary Thomas Decker; Daniel Graiver; Arthur James Tselepis; Dwight Edward Williams, all of Midland, Mich.

[73] Assignee: Dow Corning Corporation, Midland, Mich.

[21] Appl. No.: 09/115,897

[22] Filed: Jul. 15, 1998

[51] Int. Cl.$^6$ ........................................... B05D 5/00
[52] U.S. Cl. ..................... 427/387; 427/389; 427/389.9; 427/393.4
[58] Field of Search ................... 427/387, 389, 427/398.9, 393.4

[56] References Cited

U.S. PATENT DOCUMENTS

| | | | |
|---|---|---|---|
| 4,104,296 | 8/1978 | Pike | 260/448.8 R |
| 4,883,854 | 11/1989 | Coury | 528/28 |
| 5,174,813 | 12/1992 | Cifuentes | 106/3 |
| 5,290,901 | 3/1994 | Burns | 528/34 |
| 5,538,547 | 7/1996 | Wacker | 106/2 |

FOREIGN PATENT DOCUMENTS

| | | |
|---|---|---|
| J02047371 | 2/1990 | Japan. |
| 96/38453 | 12/1996 | WIPO. |
| 98/18844 | 5/1998 | WIPO. |

OTHER PUBLICATIONS

Maxka et al, Marcromol. Symp. 77, pp. 79–92, 1994.
Lach et al., Macromolecules, 31(7), pp. 2381–2383, 1998.
Interrante et al, Appl. Organomet. Chem., 12(10/11), pp. 695–705, 1998.
Rev. Macromol. Chem. Phys., vol. C37(3), pp. 555–579, 1997.
Macromolecules, vol. 30, pp. 1890–1896, 1997.
Abstract 121, ACS Meeting, Aug. 1996.
Pure Appl. Chem., vol. A32 (11), pp. 1915–1930, 1995.
Journal of Inorganic and Organometallic Polymers, vol. 4, No. 1, pp. 61–77, 1994.
Journal of Inorganic and Organometallic Polymers, vol. 5, No. 1, pp. 43–59, 1995.
Macromol. Rapid Commun., vol. 18, pp. 253–260, 1997.
Pure Appl. Chem., vol. A33 (10), pp. 1399+, 1996.
Dendritic Macromol, vol. 2, pp. 101+, 1995.
Polym. Mater. Sci. Eng., 1997, vol. 77, pp. 141–150.

*Primary Examiner*—Erma Cameron
*Attorney, Agent, or Firm*—James L. De Casare

[57] ABSTRACT

Substrates are rendered water repellent by applying to the substrate a hyperbranched polymer containing a silicon atom made by polymerizing a derivatized aminofunctional organosilicon monomer which is the reaction product of an amine functional silane monomer precursor or an amine functional polysiloxane monomer precursor and a derivative of carbonic acid or a cyclic lactone.

9 Claims, 4 Drawing Sheets

METHOD OF RENDERING SUBSTRATES WATER REPELLENT USING HYPERBRANCHED POLYMERS CONTAINING SILICON ATOMS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention is directed to hyperbranched polymers, more particularly to hyperbranched polymers containing silicon atoms, and to their use as an agent for rendering a substrate water repellent.

BACKGROUND OF THE INVENTION

Recent developments in macromolecular architecture has led to progress in dendritic macromolecules including dendrimers and hyperbranched structures. These highly branched macromolecules are characterized by their non-linear structure, which prevents crystallization, and minimizes chain entanglements.

As a result, these macromolecules display an unusual viscosity profile and solubility behavior, when compared to high molecular weight typical linear polymers. Furthermore, unlike linear polymers, the number of functional end-groups in these highly branch macromolecules is directly proportional to their molecular weight.

Thus, the potential for high numbers of functional groups, and the overall globular nature of these types of materials are advantageous in certain applications.

Hyperbranched polymers, however, differ from dendrimers in their synthetic approach, and in the degree of regularity in their structure. As a result, hyperbranched polymers are much easier to make, but their molecular weight distribution at higher molecular weights approaches infinity, compared to dendrimers, which are made tediously one generation at a time, and often with several protection and unprotection steps, extensive purification steps; but the results are a molecular weight distribution close to unity.

Thus, hyperbranched polymers are more cost effective, and therefore are more suitable on a larger scale for most commercial applications.

All synthetic approaches to hyperbranched polymer up until now have been based on a divergent method, wherein a monomer having precisely two types of functional groups react one with the other, but do not react with themselves, and having an overall functionality that is greater than two. Most simple suitable monomers of this type contain a single A functional group and two B functional groups, i.e., an $AB_2$ type monomer.

Figure 1:
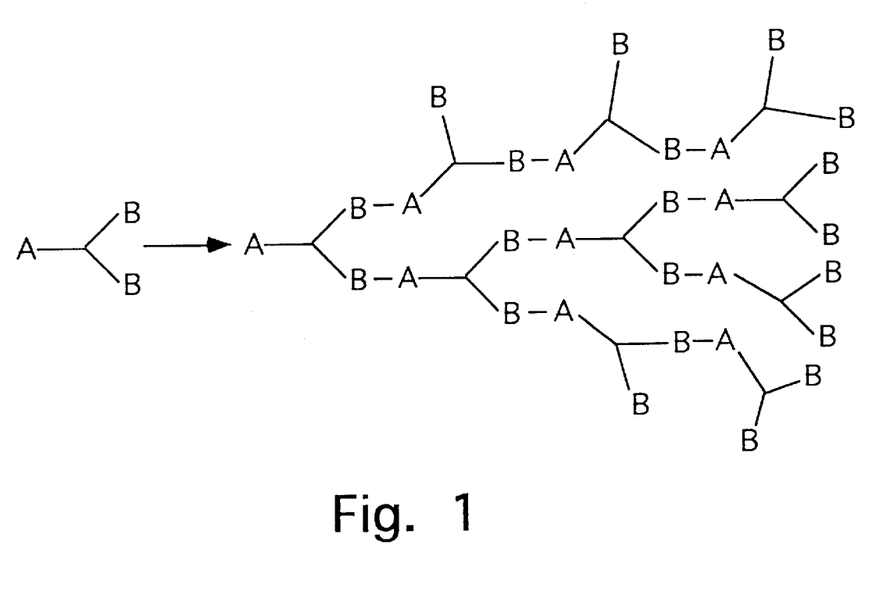
FIG. 1 is a representation of a reaction for making hyperbranched polymers in a method according to the present invention.

Such a divergent method is represented in FIG. 1 of the accompanying drawing. According to this scenario, if the monomer has a higher number of functional groups, a more dense structure is possible. Thus, a monomer containing a single A functional group and three B functional groups, i.e., an $AB_3$ type monomer, it would lead to a higher branching density upon polymerization, and a higher concentration of the B functional group on the surface of the resulting polymer. In principle, therefore, $AB_x$ type polymers can be prepared wherein x can be any integer with a value of two or greater.

Another key advantage of a hyperbranched polymer is the fact that the degree of branching can be controlled by increasing the free chain length between the functional groups. This alternative minimizes the crowding effect, and allows the production of low as well as higher molecular weight polymers.

Due to the large number of branches in such materials, the hydrodynamic volume of a hyperbranched polymer is smaller than that of a linear polymer of the same molar mass. This different relationship between the volume and molecular weight can be directly correlated with differences observed in viscosity, solubility, and other physical properties of hyperbranched polymers.

However, most hyperbranched polymers have been prepared by the polycondensation reaction of functional groups such as polyesters, ethers, and amides, with some hyperbranched polymers having been derived via C—C bonds. Some hyperbranched polymers have been prepared wherein a silane is used as a protective group during preparation of the monomer. For example, hyperbranched aromatic polycarbonates have been prepared by the polymerization of an $A_2B$ monomer derived from 1,1,1-tris(4-hydroxyphenyl) ethane $CH_3C(C_6H_4OH)_3$, in which one of the three phenol groups was protected by a trialkylsiloxy group, i.e., —OSi$(CH_3)_3$, in preparing the monomer, which was then removed prior to its polymerization.

Only relatively few hyperbranched polymers containing the silicon atom in their complex structure are known, and these materials are based on a hydrosilylation reaction of silanes and siloxanes containing vinyl and Si—H functionality, respectively. As a result, this particular type of hyperbranched polymer contains a carbosilane linkage, i.e., ≡Si—$CH_2$—.

On the other hand, and in contrast, the present invention is directed to a new use of a new type of hyperbranched polymer having a basic structure containing an ≡Si—O—C≡ linkage.

Although many different technologies have been devised to impart hydrophobic properties to a substrate, none of these methods appears perfect, and there remains a need to improve the process and the effectiveness of such treatments. The patent literature is replete with examples wherein many types of alkyl silanes and siloxanes have been used, because of the inherent hydrophobic nature of organosilicon compounds, but applicants herein are not aware of any disclosure in the public domain which replicates the invention as set forth according to the present invention.

BRIEF SUMMARY OF THE INVENTION

The invention relates to a method of rendering substrates water repellent by the application of a silicon atom containing hyperbranched polymer made by polymerizing a derivatized aminofunctional organosilicon compound to yield a carbinol functional group. In one embodiment, the derivatized aminofunctional organosilicon compound is made by reacting an amine functional silane or an amine functional polysiloxane with a derivative of carbonic acid, such as ethylene carbonate or propylene carbonate, shown respectively below:

Ethylene Carbonate

Propylene Carbonate

Polymerization of the derivatized aminofunctional organosilicon compound proceeds by exchange of the alkoxy group with the carbinol functional group, whereby by-product alcohol is formed and is removed.

In another embodiment, the derivatized aminofunctional organosilicon compound is made by reacting an amine functional silane or an amine functional polysiloxane with a cyclic lactone such as beta-propiolactone, gamma-butyrolactone, gamma-valerolactone, and gamma-caprolactone, shown respectively below:

beta-propiolactone gamma-butyrolactone gamma-valerolactone gamma-caprolactone

Cyclic lactones having a closed-ring structure containing six members can also be employed, if desired, such as lactide or glycolide.

Such hyperbranched polymers are suitable as clear hydrophobing and laminating agents for wood, starch, cotton, wool, paper, cardboard, cloth, and seeds. These hyperbranched polymers are particularly suitable in such applications as they are inherently oleophilic, but in addition, are relatively low viscosity fluids even at high molecular weight, and rearrange from a soluble, highly ordered branched structure, to a permanent, insoluble, siloxane network upon application to a substrate.

Furthermore, the high degree of crosslinking available upon rearrangement from a hyperbranched structure yields a resinous silicone matrix, which imparts mechanical integrity, thermal stability, and improves the surface lubricity and solvent resistance of treated substrates.

These and other features of the invention will become apparent from a consideration of the detailed description.

DETAILED DESCRIPTION OF THE INVENTION

According to the present invention, water repellence can be provided to a substrate by applying to the substrate certain high molecular weight hyperbranched polymers which can be prepared and rearranged to form stable covalently linked polymer networks. Unlike the typical dendrimer, these $AB_x$ type hyperbranched polymers can be easily prepared in a one step synthesis using readily available and relatively inexpensive starting materials.

Conversion of the hyperbranched structure to stable networks, i.e., rearrangement from $\equiv$Si—O—C linkages to an $\equiv$Si—O—Si$\equiv$ network, occurs upon exposure to water in the presence of an acid or a base catalyst, and the hydrolysis and polycondensation of these linkages leads to a stable siloxane network. In the presence of an alcohol, hydrolysis followed by alcoholosis leads to the complete depolymerization and the formation of only low molecular weight oligomers.

The silicon atom containing hyperbranched polymers of this invention have benefits and advantages related to the possession of a low viscosity and a high degree of functionality, even at high molecular weight.

Polymerization yielding hyperbranched polymers in accordance with this invention is based on an exchange reaction between the hydroxyl and alkoxy groups of a silane monomer. Suitable monomers as shown below contain an alcohol (hydroxyl) functionality and an alkoxy functionality attached to the silicon atom of the monomer in an appropriate ratio, and a simple exchange reaction driving off alcohol as a by-product leads to the desired hyperbranched polymerization.

By designating the alcohol portion of this molecule as A and the silyl-alkoxy portion of the molecule as B, a monomer of this type leads to $AB_2$ type hyperbranched structures.

It is also possible to use monomers having three alkoxy groups on the central silicon atom, which upon polymerization, leads to $AB_3$ type polymeric structures, provided all alkoxy groups have reacted. Otherwise, hyperbranched structures between $AB_2$ and $AB_3$ type monomers develop.

In principle at least, it is also possible to employ monomeric silanes having several alcohol groups and only a single alkoxy group, in which case, polymerization yields $A_2B$ and $A_3B$ type structures.

Generically, suitable monomeric silanes which can be employed according to the present invention can be described as being of the type having the formula $(RO)_a R'_{(4-a-b)} SiX_b$ wherein R and R' represent an alkyl radical or an aryl radical; X represents an organic radical containing an alcohol group; and the subscripts a and b represent integers having a value from 1 to 3, provided the sum of a and b has a value greater than 2 and is equal to or less than 4.

In addition to such monomeric silanes, corresponding polysiloxanes can also be used, in which case, the number of dialkyl siloxane units, i.e., "D" units $R_2SiO_{2/2}$, in the polysiloxane is not critical, but serve as linear chains between the branches of the resulting hyperbranched products.

As an example of some suitable polysiloxanes of this type which can be employed herein, reference may be had to U.S. Pat. No. 4,883,854 (Nov. 28, 1989), for polysiloxanes prepared by a method in which amines, including aminofunctional polysiloxane fluids, are reacted with ethylene carbonate or propylene carbonate to produce hydroxy-alkyl-type urethanes. Similar polysiloxanes are also described in Kokai Patent HEI 2 [1990]-47371 (Feb. 16, 1990), wherein amino-modified silicone oils are mixed with ethylene carbonate or propylene carbonate at a temperature between 40–80° C. for 1–4 hours. U.S. Pat. No. 5,290,901 (Mar. 1, 1994) may also be referred to for additional methods of preparing hydroxyl-functional polysiloxanes by reacting a cyclic silyl ether, such as 2,2,4-trimethyl-1-oxa-silacyclopentane, and a silanol. Some other suitable derivatized siloxanes, as well as derivatized silanes, which are useful herein as monomeric starting materials are taught in U.S. Pat. No. 5,174,813 (Dec. 29, 1992). These four documents are considered incorporated herein by reference.

An example of two especially preferred monomer types derived from propylene carbonate according to the present invention are shown below:

An example of two additional and especially preferred gamma-butyrolactone derived monomer types according to the present invention are shown below:

The particular type Of carbinol (hydroxy) functional silane or carbinol (hydroxy) functional siloxane, as well as methods for their preparation, are riot critical, provided provision is specially made to insure that alkoxy functional groups present in these monomeric species are not allowed to hydrolyze and condense forming siloxane linkages, i.e., ≡Si—O—Si≡. The term "carbinol" as used herein is intended to mean hydroxyl groups bound to carbon, i.e., ≡C—OH, as distinguished from hydroxyl groups bound to silicon, i.e., ≡Si—OH, which are "silanols".

Thus, the formation of excessive siloxane linkages leads to an irreversible gelation. Provided no self-condensation, or a very small amount, takes place, the alcohol by-product is removed from the reaction mixture, resulting in a hyperbranched polymer of the type shown in FIG. 1. The degree of polymerization in such a reaction is directly proportional to the amount of alcohol that is removed.

Such hyperbranched polymers can be added to substrates such as wood, cotton, paper, wool, concrete, brick, stone, leather, textiles, sawdust, starch, cellulose or its derivatives, and linoleum, with a condensation catalyst, and optionally with other reactive siloxanes such as silanol terminated low molecular weight linear polydimethylsiloxanes. Upon heating, the Si—O—C linkages are rearranged to a Si—O—Si matrix. In this application, practically no —COH type volatile materials are produced, since the carbinol functionality remains attached to the silicone matrix.

As noted, the present invention includes the use of a crystalline condensation catalyst, which is not active, as it is not soluble in the hyperbranched polymer, but which provides improved shelf life of the polymer evidenced by no gel formation. However, upon heating to a temperature above its melting point, it flows, and becomes miscible in the polymer, whereby it causes the desired rearrangement of the polymer to a permanent siloxane matrix.

Some suitable crystalline condensation catalysts which can be employed herein are, for example, imidazole having a melting point of 90° C.; 1,2-dimethylimidazole having a melting point of 37–39° C.; 1,3-diacetyl-2-imidazolidinone having a melting point of 126–128° C.; 1,4-diazabicyclo [2.2.2]octane having a melting point of 158–160° C.; 1,1'-cyclopentylidenebis-1H-pyrazole having a melting point of 132–135° C.; and 3,5-dimethylpyrazole-1-methanol having a melting point of 110–112° C.

The degree of branching and the rigidity of these structures can be controlled by controlling the free chain length between the functional groups, or by using larger values for x in an $AB_x$ type monomer. Thus, the mechanical properties of a hyperbranched siloxane matrix can be easily controlled. For example, a highly rigid, i.e., resin-like, matrix can be obtained by using highly branched structures with larger values for x, in contrast to more ductile, softer structures, which can be obtained by using linear siloxane segments between hyperbranched points, and/or using smaller values for x in the $AB_x$ structure.

Wood products treated with these hyperbranched polymers can be sealed against moisture absorption, and retain good binding properties, with no great amount of swelling occurring when the treated wood products are left in a large excess of water.

In this regard, it should be noted that due to their highly branched structure, the hydrodynamic volume of hyperbranched polymers is smaller than that of linear polymers having the same molar mass. This different relationship between the volume and the molecular weight leads to a lower viscosity than would be normally expected of a similar molecular mass linear polymer, thereby making these hyperbranched polymers more suited for the penetration of wood pores or other fine voids, as is required for any good hydrophobing agent.

Another advantage of hyperbranched polymers resides in the curing process, where such polymers undergo a structural transformation from a soluble, hyperbranched structure, to a permanent siloxane network. This curing process occurs via a simple rearrangement where no large amounts of volatile by-products such as HCl or alcohol occurs.

The nature of the chemical structure of a hyperbranched polymer will, in addition to hydrophobing a given substrate, also provide other desired properties, such as an improved abrasion resistance, a surface lubricity, and chemical resistance. The incorporation of a bio-active agent can further improve the fungicide and resistance of substrates so treated.

Hyperbranched polymers according to this invention can be applied from a solution, an emulsion, or directly from bulk without further dilution. Treatment processes include dipping, spraying, brushing, or coating the hyperbranched polymer onto the substrate. Since the polymers are transparent, the beauty of treated wood or other substrates will not be compromised.

One embodiment of hyperbranched polymers according to this invention which are derived from a derivative of carbonic acid include units of the formula wherein R" is an alkyl group containing 1–4 carbon atoms such as methyl, ethyl, propyl, and butyl; phenyl; or a substituted alkyl group such as phenylmethyl, phenylbutyl, chloromethyl, methoxy, ethoxy, methylamino, hydroxyethyl, and carboxyethyl; R'" is an alkylene radical, i.e., —$C_mH_{2m}$—, containing 3 or 4 carbon atoms; R"" is hydrogen or an alkyl group containing 1–4 carbon atoms; c has a value of 2 or 3; d is zero or one; and m is 3 or 4.

Another embodiment of hyperbranched polymers according to this invention which are derived from a cyclic lactone include units of the formula wherein R" is an alkyl group containing 1–4 carbon atoms such as methyl, ethyl, propyl, and butyl; phenyl; or a substituted alkyl group such as phenylmethyl, phenylbutyl, chloromethyl, methoxy, ethoxy, methylamino, hydroxyethyl, and carboxyethyl; R'" is an alkylene radical, i.e., —$C_mH_{2m}$—, containing 3 or 4 carbon atoms; R"" is hydrogen or an alkyl group containing 1–4 carbon atoms; c has a value of 2 or 3; d is zero or one; m is 3 or 4; and e is 2, 3, or 4.

EXAMPLES

The following examples are set forth in order to illustrate the present invention in more detail, including the specifics in methods for preparing hyperbranched polymers according to this invention.

Example 1

$AB_3$ type monomer

An $AB_3$ type monomer was prepared in a one liter 3-neck flask equipped with a thermometer, a nitrogen adapter, an air powered stirrer, and a water cooled condenser, by charging to the flask 380.3 grams (1.72 moles) of monomer precursor 3-aminopropyltriethoxysilane $H_2N(CH_2)_3Si(OCH_2CH_3)_3$, and 175.38 grams (1.72 moles) of propylene carbonate. This mixture was allowed to stir overnight with no heat under a nitrogen blanket. Upon overnight standing, the viscosity of the mixture increased. This material was checked for complete reaction of the amine groups on the aminopropyltriethoxysilane by titration of the mixture with a phenolphthalein solution. The phenolphthalein solution was mixed by dissolving 0.1 grams of phenolphthalein in 100 grams of ethanol, and mixing six milliliters of the resulting solution with one gallon (3.785 liter) of 50/50 butanol/toluene. This check revealed no basic nature to the mixture, which is indicative of complete derivatization of amino groups.

Polymerization of the thusly prepared $AB_3$ type monomer depicted above to a high molecular weight hyperbranched polymer was accomplished by attaching a Dean-Stark trap to the flask, and heating the monomer with no catalyst to 90° C. with a nitrogen sweep. The rate of nitrogen flow was controlled with a bubbler in combination with a rubber septum over the condenser, into which a hypodermic needle was inserted. This allowed the flow of nitrogen to escape from the condenser, and ethanol was condensed and collected in the Dean-Stark trap. After two hours of heating with a nitrogen sweep, 19 milliliters of ethanol was recovered.

The resulting viscous, hyperbranched polymeric liquid was analyzed by gel permeation chromatography (GPC). The molecular weight ($M_n$) of the polymer was $1.378 \times 10^3$, calibrated against linear polystyrene, and its polydispersity ($M_w/M_n$) was 2.54. Further evidence for the hyperbranched structure was derived from an analysis of the polymer by $^{29}$Si NMR and $^{13}$C NMR. The $^{29}$Si NMR spectrum revealed four peaks, indicative of unbranched, single branch, double branch, and triple branch silicon atoms, with less than one percent siloxane condensation. The $^{13}$C NMR indicated that the desired reaction had been accomplished, indicated by the appearance of a peak associated with a carbon attached to a carbonyl group, i.e., =C=O, at between 156.53 and 155.22 ppm.

Figure 2:
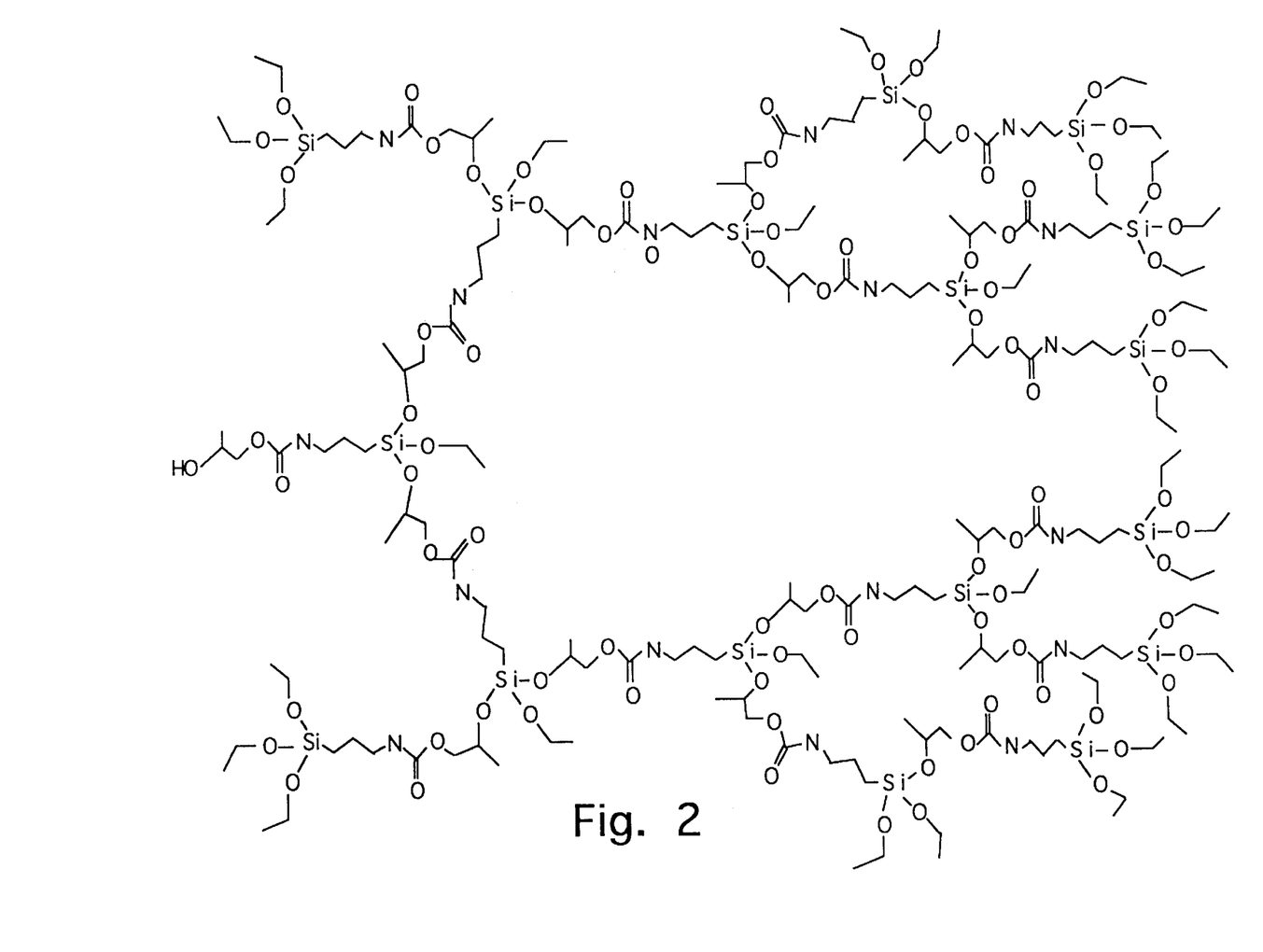
FIG. 2 is a representation of the ideal structure of an $AB_3$ hyperbranched polymer made in Example 1 in a method according to the present invention.

The polymer prepared according to this example had a structure as illustrated in FIG. 2 of the drawing.

Example 2

$AB_2$ Type Monomer

An $AB_2$ type monomer was prepared in a 500 milliliter 3-neck flask equipped with a thermometer, a nitrogen adapter, an air powered stirrer, and a water cooled condenser, by charging to the flask 40.0 grams (0.209 moles) of monomer precursor 3-aminopropylmethyldiethoxysilane $H_2N(CH_2)_3(CH_3)Si(OCH_2CH_3)_2$, and 21.34 grams (0.209 moles) of propylene carbonate. This mixture was allowed to stir overnight with no heat under a nitrogen blanket. Upon overnight standing, the viscosity of the mixture increased. This material was checked for complete derivatization of amine groups on the aminopropylmethyldiethoxysilane by titration of the mixture with phenolphthalein solution. This check revealed no basic nature to the mixture, which is indicative of complete derivatization of amino groups.

Polymerization of the resulting $AB_2$ type monomer depicted above to a high molecular weight hyperbranched polymer was accomplished by attaching a Dean-Stark trap to the flask, and heating to 90° C. with a nitrogen sweep. The rate of nitrogen flow was controlled with a bubbler in combination with a rubber septum over the condenser into which a hypodermic needle was inserted. This allowed the flow of nitrogen to escape the condenser, and ethanol was condensed and collected in the Dean-Stark trap. After heating overnight with a nitrogen sweep, 12.3 milliliters of ethanol was recovered. The high molecular weight hyperbranched polymer had a glass transition temperature $T_g$ of −30° C. and a melting point of 124° C.

Example 3

$AB_2$ Type Monomer

An $AB_2$ type monomer was prepared in a 500 milliliter 3-neck flask equipped with a thermometer, a nitrogen adapter, an air powered stirrer, and a water cooled condenser, by charging to the flask 51.21 grams (0.27 moles) of monomer precursor 3-aminopropylmethyldiethoxysilane, and 29.45 grams (0.33 moles) of ethylene carbonate. This mixture was heated to 40° C. to melt the ethylene carbonate. The heat was turned off after one hour, and the mixture was allowed to stir overnight with no heat and under a nitrogen blanket. Upon overnight standing, the viscosity of the mixture had increased, and excess of ethylene carbonate had recrystallized in the flask. The material was filtered to remove excess ethylene carbonate. This material was checked for complete derivatization of amine groups on the aminopropylmethyldiethoxysilane by titration of the mixture with phenolphthalein solution. This check revealed no basic nature to the mixture, which is indicative of complete derivatization of amino groups.

Polymerization of this $AB_2$ type monomer to a high molecular weight hyperbranched polymer was accomplished by attaching a Dean-Stark trap to the flask, and heating to 90° C. with a nitrogen sweep. The rate of nitrogen flow was controlled with a bubbler in combination with a rubber septum over the condenser, into which a hypodermic needle was inserted. This allowed the flow of nitrogen to escape the condenser, and ethanol was condensed and collected in the Dean-Stark trap. After heating overnight with a nitrogen sweep, 12.0 milliliters of ethanol had been recovered.

Figure 3:
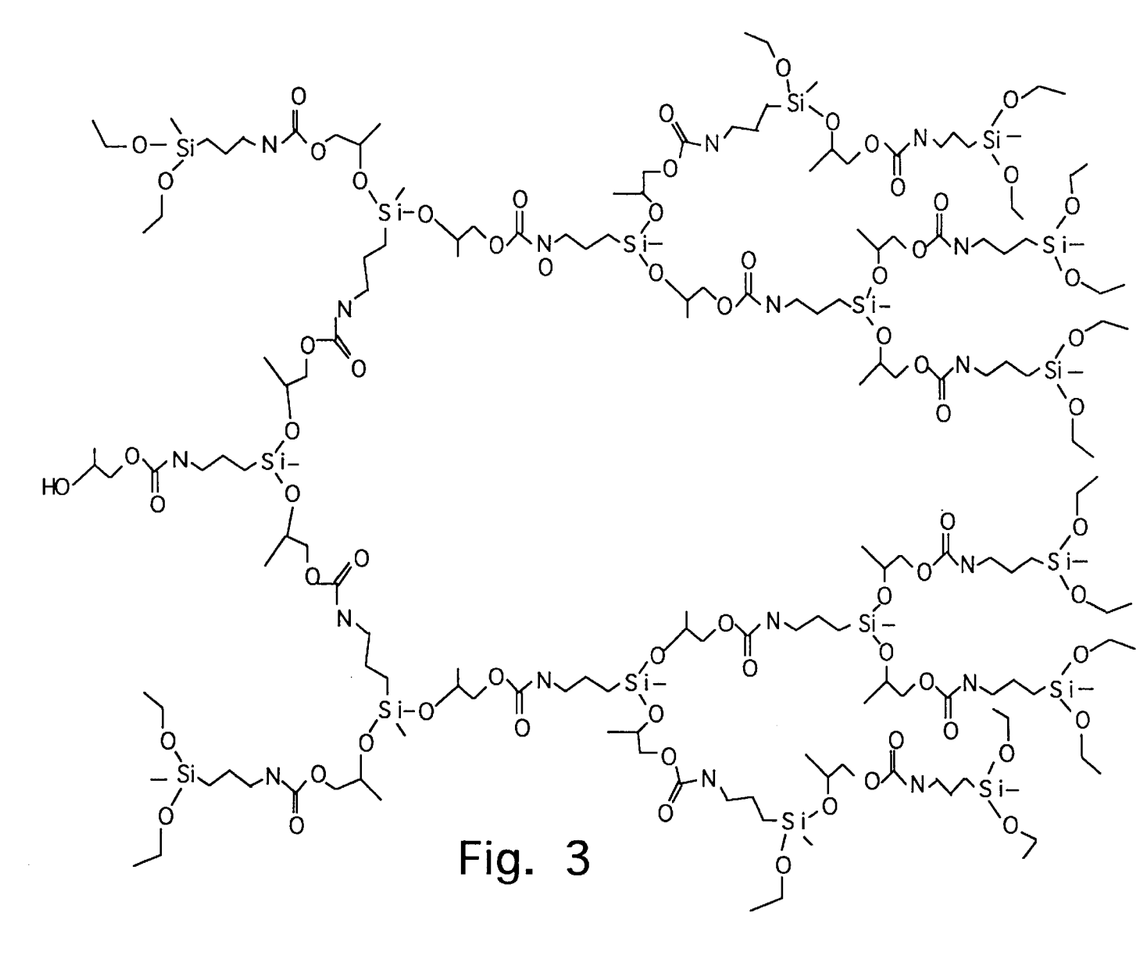
FIG. 3 is a representation of the ideal structure of an $AB_2$ hyperbranched polymer made in Examples 2 and 3 in a method according to the present invention.

The structure of $AB_2$ type polymers prepared according to Examples 2 and 3 is illustrated in FIG. 3 of the accompanying drawing.

Example 4

$AB_3$ Type Monomer

An $AB_3$ type monomer was prepared in a one liter 3-neck flask equipped with a thermometer, a nitrogen adapter, an air powered stirrer, and a water cooled condenser, by charging to the flask 179.29 grams (1.00 mole) of monomer precursor 3-aminopropyltrimethoxysilane $H_2N(CH_2)_3Si(OCH_3)_3$, and 89.06 grams (1.00 mole) of gamma-butyrolactone. This mixture was allowed to stir overnight with no neat under a nitrogen blanket. Upon overnight standing, the viscosity of the mixture increased. This material was checked for complete reaction of the amine groups on the aminopropyltrimethoxysilane by titration of the mixture with a phenolphthalein solution. This check revealed no basic nature to the mixture, which is indicative of complete derivatization of amino groups.

Example 5

$AB_3$ Type Polymer

A sample of 20.0 grams of the monomer prepared in Example 4 was placed in a two ounce (60 ml) vial. The vial was sealed with a rubber septum, and dry nitrogen was bubbled through the material in the vial for four hours. Methanol and excess nitrogen was vented through a hypodermic needle inserted through the septum. The molecular weight of the resulting hyperbranched polymer was controlled by the removal of methanol.

Figure 4:
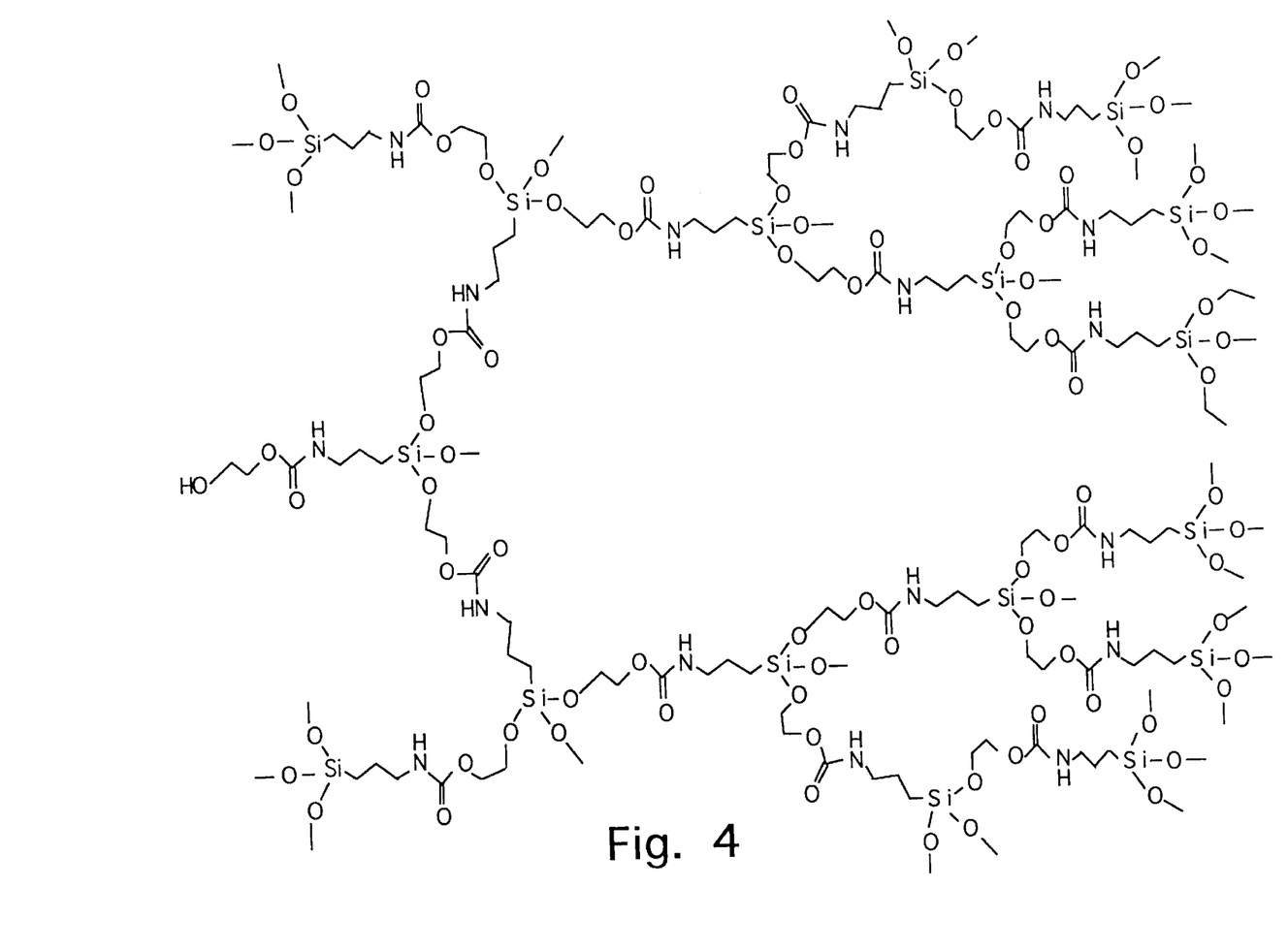
FIG. 4 is a representation of the ideal structure of an $AB_3$ hyperbranched polymer made in Example 5 in a method according to the present invention.

The polymer prepared according to this example had a structure as illustrated in FIG. 4 of the drawing.

Some other examples of monomer precursor types $AB_2$ and $AB_3$ which are useful herein according to this invention, in addition to 3-aminopropyltrimethoxysilane, 3-aminopropyltriethoxysilane, and 3-aminopropylmethyldiethoxysilane, are 4-aminobutyltriethoxysilane, 3-[2-(2-aminoethylamino) ethylamino]propyltrimethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltris(2-ethylhexoxy)silane, N-(6-aminohexyl)aminopropyltrimethoxysilane, m-aminophenyltrimethoxysilane, p-aminophenyltrimethoxysilane, and o-aminophenyltrimethoxysilane.

The following additional examples are set forth in order to further illustrate the present invention in yet more detail.

Example 6

$AB_3$ Type Monomer

An $AB_3$ type monomer was prepared in a one liter 3-neck flask equipped with a thermometer, a nitrogen adapter, an air powered stirrer, and a water cooled condenser, by charging to the flask 221.37 grams (1.00 mole) of monomer precursor 3-aminopropyltriethoxysilane $H_2N(CH_2)_3Si(OC_2H_5)_3$, and 89.06 grams (1.00 mole) of gamma-butyrolactone. This mixture was allowed to stir overnight with no heat under a nitrogen blanket. Upon overnight standing, the viscosity of the mixture increased. This material was checked for complete reaction of the amine groups on the aminopropyltriethoxysilane by titration of the mixture with a phenolphthalein solution. This check revealed no basic nature to the mixture, which is indicative of complete derivatization of amino groups.

Polymerization of this $AB_3$ type monomer to a high molecular weight hyperbranched polymer was accomplished by the procedure used in Example 1.

Example 7

Treatment of Sawdust

Into a 1 pint (~0.5 liter) container was added 25.0 grams of sawdust, and 6.0 grams of a silanol terminated low molecular weight polydimethylsiloxane having an average degree of polymerization of 39. The mixture was shaken to disperse the siloxane fluid with the sawdust. Then, one gram of the polymer from Example 6 was added, along with 0.1 gram of imidazole as a catalyst. The mixture was again shaken, placed between two sheets of mylar in a 4×6 inch (10×15 cm) mold, and cold pressed to 1200 psi (8,274 kPa) for 3 minutes. The temperature of the cold press was raised to 150° C. for 10 minutes. A particle board was formed, the surface of which was hydrophobic, as noted from the contact angle of water.

Example 8

Durability of the Hydrophobic Treatment

A particle board similar to the particle board described in Example 7 was placed in a large excess of water and left at room temperature. The particle board was examined periodically over a one week period, and it remained hydrophobic, with no detectable change in the board's dimensional stability.

The treatment of substrates to render them more hydrophobic can be achieved by using a hydrophobing composition that contains a combination of the hyperbranched polymer and other linear polyalkysiloxanes, and this option is illustrated above in Example 7.

The use of such hydrophobing compositions affects physical properties such as hydrophobicity, lubricity, and pore penetration, and mechanical properties such as flexibility and viscosity. There are a number of ways that linear siloxane segments can be incorporated into such hyperbranched structures.

For example, the combination of an $AB_x$ type silane and a silanol terminated polydimethylsiloxane oligomer provides a multiple linear segment that initiates and terminates within the hyperbranched polymer, i.e., that is a morphology consisting of hyperbranched polymer domains connected through the linear polymer. Prior to rearrangement into a permanent siloxane, interactions between the hyperbranched and linear polymers is via a silanol-alcohol and silanol-alkoxysilane interaction.

The combination of an $AB_x$ type polysiloxane oligomer or polymer, and a polysiloxane terminated with alkoxy groups and an alcohol group, provides a hyperbranched structure having a linear spacer between branches.

The combination of an $AB_x$ type silane and an alkoxy terminated polysiloxane provides a dumbbell like polymer, wherein a hyperbranched structure is built at the ends of the linear polymer. Prior to rearrangement to the permanent siloxane matrix, this morphology derives from an exchange of the alkoxy silane at the ends of the linear polymer and those on the $AB_x$ silane, as well as an interaction of the alkoxy silane and the alcohol on the silane.

The example set forth below describes this latter approach, using an alkoxy terminated polydimethylsiloxane.

Example 9

Into a resin pot was added 700 grams of a methoxy terminated polysiloxane having a viscosity of about 65,000 centistoke (mm²/s) at 25° C., 70 grams of the $AB_3$ type monomer prepared in Example 6. The pot was heated to 80° C. under nitrogen bubbling for 72 hours to remove alcohol by-product. A sample from this mixture was placed in an aluminum pan, and heated in an air circulating oven to 90° C. for 24 hours. No apparent change or formation of a gel was noted. A similar sample was placed in a separate aluminum pan with 1 drop of tetrabutyl titanate, and heated to 90° C. for 5 minutes. This latter sample cured to a tack free elastomer.

The combination of a linear polysiloxane with a hyperbranched siloxane as illustrated above, does not result in a simple mixture of the components. The specific interactions between the components as pointed out above, ensures provision of a homogeneous product, which has a longer shelf-life, and no apparent phase separation has been observed.

It should be noted that hydrophobing compositions according to this invention containing $AB_x$ monomers or hyperbranched polymers made from $AB_x$ monomers, i.e., the hyperbranched substance, and optionally other materials such as silanol functional polysiloxanes, may be applied either with or without the condensation catalyst. In the first instance, the catalyst can be added to the hydrophobing composition immediately before it is used and then applied to the substrate; or a catalyst that provides latent heat cure, i.e., a one-part composition activated by heat, may be pre-added, so that the one-part composition does not cure until heat is applied. Optionally, the hydrophobing composition can be used without including a catalyst, provided a sufficiently high temperature can be applied to the substrate being treated.

In using hydrophobing compositions according to the invention, at least a trace amount of moisture should be present during the cure reaction of the hyperbranched substance, and in addition, an appropriate catalyst or heat is required if a rapid cure is desired. The hyperbranched substance in the hydrophobing composition may be applied as the hyperbranched polymer, or as end groups or pendent groups of a polysiloxane.

The following additional examples are set forth for the purpose of illustrating the effectiveness of hydrophobing compositions according to this invention in the treatment of wood.

Example 10

Standard Gravimetric, Beading, and Swellometer Tests were conducted in order to evaluate wood treated with two hydrophobing compositions, each containing a hyperbranched polymer at 10 weight percent solids in mineral spirits. An effective amount of tetrabutyl titanate (TBT), a non-crystalline condensation catalyst, was added to each hydrophobing composition shortly before treatment. The first hydrophobing composition contained a hyperbranched polymer pre-reacted with a 60,000 centistoke dimethylsilicone fluid having hydroxy end groups, by heating the two components together in a manner similar to Example 7. The second hydrophobing composition contained a hyperbranched polymer mechanically blended at room temperature with a lower molecular weight hydroxy end-blocked dimethyl silicone fluid.

In The Gravimetric Test, a board was used whose surface was dominated by side grain with little end grain. The Swellometer Test used a board whose surface was dominated by end grain with little side grain.

The Gravimetric Test measures the amount of water picked up by treated and untreated Southern Yellow Pine boards with dimensions of 2"×4"×6". Results are expressed as a percent of the water excluded by the treated board relative to that of an untreated control, expressed as % WRE (Water Repellent Effectiveness). The higher the value of the % WRE, the better the performance in this test.

In the Beading Test, the ability of the treatment to bead water on the wood substrate is subjective. In the Beading Test, a technician visually observes the contact angle and assigns a rating of 0 to 5, where 0 denotes no beading and a rating of 5 denotes that a sphere is resting on the surface of the substrate. A Beading Test rating of 3 indicates that there was a 90° contact angle.

The Swellometer Test also measures percent water excluded relative to a control, expressed as % WE (Water Exclusion). In addition, this test measures water resistance, meaning the lengthwise dimensional change relative to a control, and it is expressed as % WR (Water Repellency). Water exclusion is measured the same as in the Gravimetric Test. Water resistance is measured with a micrometer to the nearest 0.001" on a ¼"×1½"×9½" board cut along the cross grain. Both treated and untreated boards are placed into the Swellometer Test holder and the micrometer is set to zero. The boards are submerged in water for thirty minutes and any dimensional change is recorded. The results are reported as a percent of the dimensional change of a treated board relative to that of an untreated board. Again, the higher the value, the better is the performance in this test.

Results of the Gravimetric and Swellometer Tests in this example are shown below in Table 1.

TABLE 1

| Hydrophobing Composition | % WRE | Beading | % WE | % WR |
|---|---|---|---|---|
| First | 73 | 2 + | 50 | 5 |
| Second | 52 | 0 | 50 | 36 |

The results in Table 1 indicate that the first hydrophobing composition performed better in the Gravimetric/Water Exclusion Test on the 2"×4"×6" end grain board. Both the first and the second hydrophobing composition performed about the same in the Swellometer/Water Exclusion Test on the ¼"×1½"×9½ cross grain board. The second hydrophobing composition performed better in the Swellometer/Dimensional Change Test, despite the fact that there was no difference in water exclusion.

Example 11

Example 10 was repeated, except that an emulsion form of hydrophobing composition was employed, and the results of this example are shown below in Table 2. The emulsions were prepared according to standard techniques, as exemplified by emulsification methods detailed in U.S. Pat. No. 5,695,551 (Dec. 9, 1997, which is considered incorporated herein by reference. The '551 patent also contains details and further specifics on the Standard Gravimetric, Beading, and Swellometer Tests.

TABLE 2

| Example | Hyper-branched Polymer | % Actives | Gravimetric | | Swellometer | |
|---|---|---|---|---|---|---|
| | | | % WRE | Beading | % WE | % WR |
| II A | I | 10 | 72.5 | 2 + | 49.5 | 5.2 |
| II B | II | 10 | 51.7 | 0 | 49.7 | 35.6 |
| II C | II | 8 | 67.1 | 1 | 49.7 | 12.0 |
| II D | II | 8 | 76.1 | 1 | 51.5 | 11.0 |
| II E | II | 8 | 77.9 | 2 | 36.8 | 7.0 |
| II F | II | 8 | 81.2 | 2 | 46.0 | 11.9 |

The hyperbranched polymer I used in Example 11 A was the reaction product of a methoxy endblocked polysiloxane and the AB$_3$ monomer similar to the polymer prepared in Example 9. The hyperbranched polymer II used in Examples 11 B–F was a physical mixture of a hydroxy endblocked polysiloxane and the AB$_3$ monomer similar to the polymer used in the second hydrophobing composition in Example 10.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A method of treating a substrate to render the substrate water repellent comprising applying to the substrate a hyperbranched polymer containing a silicon atom made by polymerizing a derivatized aminofunctional organosilicon monomer which is the reaction product of an amine functional silane monomer precursor or an amine functional polysiloxane monomer precursor and a carbonic acid derivative or a cyclic lactone.

2. A method according to claim 1 including the step of removing by-product alcohol formed during polymerization of the derivatized aminofunctional organosilicon monomer.

3. A method according to claim 1 in which the derivative of carbonic acid is ethylene carbonate or propylene carbonate.

4. A method according to claim 1 in which the cyclic lactone is beta-propiolactone, gamma-butyrolactone, gamma-valerolactone, or gamma-caprolactone.

5. A method according to claim 1 in which the derivatized aminofunctional organosilicon monomer has the formula $(RO)_a R'_{(4-a-b)} SiX_b$ wherein R and R' represent an alkyl radical or an aryl radical; X represents an organic radical containing an alcohol group; and the subscripts a and b represent integers having a value from 1 to 3, provided the sum of a and b has a value greater than 2, and is equal to or less than 4.

6. A method according to claim 1 in which the amine functional silane monomer precursor is selected from the group consisting of 3-aminopropylmethyldiethoxysilane, 3-aminopropyltriethoxysilane, 4-aminobutyltriethoxysilane, 3-(2-(2-aminoethylamino)ethylamino)propyltrimethoxysilane, N-(2-aminoethyl)-3-aminoisobutylmethyldimethoxysilane, (aminoethylaminomethyl)phenethyltrimethoxysilane, N-(2-aminoethyl)-3-aminopropylmethyldimethoxysilane, N-(2-aminoethyl)-3-aminopropyltrimethoxysilane, N-(2-aminoethyl)-3-aminopropyltris(2-ethylhexoxy)silane, N-(6-aminohexyl)aminopropyltrimethoxysilane, m-aminophenyltrimethoxysilane, p-aminophenyltrimethoxysilane, o-aminophenyltrimethoxysilane, and 3-aminopropyltrimethoxysilane.

7. A method according to claim 1 in which the derivatized aminofunctional organosilicon monomer is selected from the group consisting of:

8. A method of treating a substrate to render the substrate water repellent comprising applying to the substrate a hyperbranched polymer comprising units of the formula or units of the formula wherein R'' is an alkyl group containing 1–4 carbon atoms, phenyl, or a substituted alkyl group; R''' is an alkylene radical containing 3 or 4 carbon atoms; R'''' is hydrogen or an alkyl group containing 1–4 carbon atoms; c has a value of 2 or 3; d is zero or one; and e is 2, 3, or 4.

9. A method according to claim 8 in which the hyperbranched polymer is applied to the substrate as a solution, an emulsion, or directly without dilution.

* * * * *